United States Patent
Zhang et al.

(10) Patent No.: US 8,522,544 B2
(45) Date of Patent: Sep. 3, 2013

(54) OCEANIC WAVE ENERGY UTILIZATION SYSTEM

(76) Inventors: Yi Zhang, Beijing (CN); Jilin Zhang, Beijing (CN); Huijie Zhang, Beijing (CN); Xiaoqin Zhuo, Beijing (CN); Feng Liu, Beijing (CN)

( * ) Notice: Subject to any disclaimer, the term of this patent is extended or adjusted under 35 U.S.C. 154(b) by 312 days.

(21) Appl. No.: 13/055,563

(22) PCT Filed: Aug. 6, 2009

(86) PCT No.: PCT/CN2009/073133
§ 371 (c)(1),
(2), (4) Date: Jan. 24, 2011

(87) PCT Pub. No.: WO2010/015209
PCT Pub. Date: Feb. 11, 2010

(65) Prior Publication Data
US 2011/0113770 A1    May 19, 2011

(30) Foreign Application Priority Data

| Aug. 6, 2008 | (CN) | 2008 1 0117922 |
| Sep. 27, 2008 | (CN) | 2008 1 0223412 |
| Jul. 13, 2009 | (CN) | 2009 1 0016763 |

(51) Int. Cl.
*F03B 13/18*    (2006.01)

(52) U.S. Cl.
USPC .............................................. 60/497; 60/499

(58) Field of Classification Search
USPC ..................................................... 60/49–507
See application file for complete search history.

(56) References Cited

U.S. PATENT DOCUMENTS

| 892,567 | A | * | 7/1908 | Thrasher | 60/506 |
| 3,965,365 | A | * | 6/1976 | Parr | 290/53 |
| 4,108,578 | A |   | 8/1978 | Corey |  |
| 4,285,196 | A | * | 8/1981 | Ekstrom et al. | 60/499 |
| 4,544,849 | A | * | 10/1985 | Choi | 290/53 |
| 4,622,473 | A | * | 11/1986 | Curry | 290/53 |

FOREIGN PATENT DOCUMENTS

| CN | 1763366 A | 4/2006 |
| CN | 2856471 Y | 1/2007 |
| CN | 1963182 A | 5/2007 |
| CN | 200978771 Y | 11/2007 |
| CN | 201031767 Y | 3/2008 |

* cited by examiner

*Primary Examiner* — Thomas Denion
*Assistant Examiner* — Philip Eklem
(74) *Attorney, Agent, or Firm* — Cheng-Ju Chiang

(57) ABSTRACT

An oceanic wave energy utilization system includes a floating energy collection device, an energy transfer device and an energy conversion device. The floating energy collection device is connected to the energy conversion device via the energy transfer device. The floating energy collection device is made up of a hull-shaped float and a float limitation device. Vertical energy collection plates are arranged at the underside of the float, while the energy transfer device is made up of a fixed seat and an energy transfer rod, said fixed seat being fixed at shore-side or at the seabed and movably connected to the energy transfer rod. The energy transfer rod is movably connected to the floating energy collection device and to the energy conversion device.

12 Claims, 7 Drawing Sheets

OCEANIC WAVE ENERGY UTILIZATION SYSTEM

CROSS REFERENCE TO RELATED APPLICATIONS

The present application is a 35 U.S.C.§371 National Phase conversion of International (PCT) Patent Application No. PCT/CN2009/073133, filed on Aug. 6, 2009, the disclosure of which is incorporated by reference herein. The PCT International Patent Application was published in Chinese.

TECHNICAL FIELD

The present invention relates to the technical field of energy conversion, in particular to an oceanic wave energy utilization system.

BACKGROUND OF THE INVENTION

The ocean covers more than 70% of earth surface. Under different moon's gravities during different time periods, the sea water in the ocean produces rising tide and falling tide twice from day to day, with tidal difference ranging from 2-6 meter and even more than 10 meters. In addition, varying fluctuation wave is also produced. Such tide and wave can generate tremendous energy.

In the tidal power generation of the prior art, shrinkage water channel is utilized to introduce the oceanic wave on the tide to the elevated reservoir to form head of water (water head), and the down flow of water head is utilized to directly drive the water-turbine generator set to generate power. As a result, very little tidal energy is used in power generation.

Wind wave can be generated when wind acting on sea water, and surge can be caused by earthquake and volcanic explosion at sea bottom. As a result, the oceanic wave energy is the most abundant, inexhaustible, polar and reliable energy resources in the earth, while wave energy also accounts for major weight in ocean energy sources. The wave motion of sea water can generate enormous energy in the forms of up-and-down, backwards and forwards, left and right fluctuation, sloshing and swarming of sea water. According to estimation, the wave energy that can be easily utilized in the world's ocean is more than 100 billion KW.

The tidal energy and wave energy are the cleanest renewable resources. With the development and utilization of tidal energy and wave energy, it is feasible to basically eliminate the energy crisis due to the gradual drain of mineral energy and to improve the environmental damage resulted from the burning of mineral energy.

In the past, the oceanic wave energy and tidal energy as always regarded as a disordered, dispersed, interrupted, uncontrollable, low-speed and low-grade mechanical energy, which can only be utilized unless it has been turned into orderly, concentrated, continuous, controllable and high speed energy through intermediate links.

For the past century, the scientists all over the world have made unremitting endeavors to put forward hundreds of assumptions and invent various devices for utilizing oceanic wave energy for power generation. At present, in addition to said tidal power generation device, the comparatively mature wave power generation devices are also divided into the following two major types:

One is "wave-compressed air type". A container device with fixed volume, which is communicated with the sea water, is adopted; the changes in the water surface position generated by the waves cause the changes in the air volume in the container; with the air in the compression container as intermediate agent, the compressed air is used to drive the impeller, which in turn drives the power generation system to generate power;

The second is "mechanical drive liquid type". The movement of oceanic wave is used to push the movable mechanical parts of intermediate device, such as duck body, raft body and floater, the movable mechanical parts drive intermediate agent, such as oil or water, to push the power generation system to generate power.

It is difficult for other types of mechanical energy conversion devices to achieve continuous, stable, concentrated and controllable energy with even rate, so that they are less applied.

Although three types of wave power generation devices have their respective advantages, they have common disadvantages as follows: 1. Multiple intermediate links for converting oceanic wave energy to electric energy, complex equipment, low efficiency, not easy to form large-scale power generation; 2. Only one-dimension energy in the mechanical energy of oceanic wave can be partially utilized, and it is impossible to absorber the disordered, dispersed, low-density and unstable three-dimensional wave energy, leading to higher power-production cost; 3. The oceanic wave energy conversion devices and their structures have poor ability to withstand catastrophic maritime climates, so that it is not easy to resist the damages from typhoon and tsunami, causing major potential safety hazards. This is a major problem in the development and utilization of oceanic wave energy at present.

Recently, a floating type sea snake technology has been developed in western European countries, including UK. Several floats connected in series are used to ride on the oceanic wave and utilizes the changes in the undulating angles of oceanic wave to impel the pistons of floats for power generation. Such mode can indeed enhance the wind and wave resistance of system. However, in fact the fluctuation of water wave is very gentle with very small angular change, and it is perpendicular to the wave peak line. Therefore, a string of floats can only correspond to the water wave with very small width. As a result, such floating type sea snake technology can not produce ideal efficiency and sufficient strong ability for resisting typhoon and tsunami, failing to overcome said problem.

As a result of different kinds of technical problems, the cost of wave power generation is 10 times higher than that of thermal power generation, and there are also potential safety hazards in the field.

More complex science and technology does not mean better effect. On the contrary, it is high-tech that can use the most simple equipment and method to overcome the problem that has been regarded as being difficult to address. To improve the practical effect of wave power generation, it is necessary to address the major problems in the prior art, slip the leash from traditional concept, reduce the intermediate links, utilize simple but convenient and reliable equipment to adapt to the actual conditions of oceanic wave movement and thus to realize the conversation of three-dimensional energy produced by oceanic wave.

SUMMARY OF THE INVENTION

It is technical object of the present invention to provide a oceanic wave energy utilization system, namely an oceanic wave energy generating equipment that can relatively adequately convert the disordered mechanical energy of oceanic wave in three-dimensional directions (such as up-anddown, front and back, left and right and rotation) to electric energy, in order to address said problem.

The following technical solution is adopted to achieve said objective of the present invention:

An oceanic wave energy utilization system includes a floating energy collection device, an energy transfer device and an energy conversion device, the floating energy collection device is connected to the energy conversion device via the energy transfer device, wherein the floating energy collection device is made up of a hull-shaped float and a float limitation device. Vertical energy collection plates are arranged at the underside of the float, while the energy transfer device is made up of a fixed seat and an energy transfer rod, said fixed seat being fixed at shore-side or at the seabed and movably connected to the energy transfer rod. The energy transfer rod is movably connected to the floating energy collection device and to the energy conversion device.

The oceanic wave energy utilization system also includes an energy storage device and a doing-work machinery, one end of the energy storage device is connected with the energy conversion device, and another end of the energy storage device is connected with the doing-work machinery.

When the fixed seat in the energy transfer device is set at shore-side, the energy transfer device includes rack push-pull rods that are vertically arranged, floating push-pull rods that are horizontally arranged as well as a lever that is movably connected to the fixed seat, which are respectively movably connected with the floating energy collection device and the energy conversion device; the energy conversion device includes a gear set and a hydraulic cylinder; the energy storage device is a hydraulic energy storage device, a cylinder with a piston, with spring or gasbag being set in the space where one end of the piston is located, and liquid being set in another end of the piston; the energy storage device is communicated with a hydraulic cylinder of the energy conversion device and a energy supply pipeline; the energy supply pipeline is communicated with the doing-work machinery, and hydraulic flow regulating valves are set on the energy supply pipeline.

The lower end of the rack push-pull rod is connected with the top of the floating energy collection device, and the upper end of the rack push-pull rod is connected with the gear set; the gear set includes a driving wheel, a two-way ratchet mechanism and a driven wheel; the rack push-pull rod is engaged with the driving wheel, the driving wheel is connected with the two-way ratchet mechanism and drives the two-way ratchet structure; the two-way ratchet mechanism includes two ratchet wheels with their ratchets swinging in opposite directions; Of said two ratchet wheels, a ratchet wheel is connected with the engaged wheel and drives the engaged wheel; the two-way ratchet mechanism is connected with a hydraulic cylinder in the energy conversion device; a piston, a lead screw piston rod and a lead screw nut are provided in the hydraulic cylinder, the lead screw piston rod is set in the center of the hydraulic cylinder and makes axial movement with the rotation of the lead screw nut at the top of the hydraulic cylinder and thus drives the position to make movement; the lead screw nut is respectively engaged with another ratchet wheel of two ratchet wheels and the driven wheel.

The floating push rod is an energy transfer rod with specific weight being smaller than seawater, one end of the energy transfer rod is movably connected with the water level part of the floating energy collection device, and another end of the energy transfer rod is in slidably connected with the lower end of a oscillating lever via the bushing of push-pull rod; the oscillating lever is vertically fixed at shore-side via the fixed seat, the lower end of the oscillating lever is connected with the floating push-pull rod, and the upper end of the oscillating lever is connected with the piston rod of a hydraulic cylinder in the energy conversion device.

When the fixed seat of the energy transfer device is set at shore-side, the energy transfer device includes a horizontally arranged floating push-pull rod and a vertically arranged swing lever, the energy conversion device is a gear assembly; the energy storage device is an energy storage flywheel; and the doing-work machinery is a generator.

The floating push rod is an energy transmission rod with specific weight being smaller than seawater, one end of the energy transmission rod is movably connected with the floating energy collection device, another end of the energy transmission rod is connected with the lower end of a oscillating lever via the bushing of push-pull rod; the oscillating lever is vertically fixed on the seat at shore-side via the fixed seat, rack slide opening is set on the upper end of the oscillating lever and is movably connected with the sliding rack in the rack slide carriage; and the sliding rack drives the gear assembly to work.

The gear assembly includes a rack, a ratchet gear and a ratchet driven wheel, the rack is slidably provided in the rack slide carriage which is horizontally set at shore-side, one end of the rack is connected with the rack slide opening on the oscillating lever via rack pull pin; the ratchet gear includes a clockwise rotation ratchet wheel and a counter clockwise rotation reverse rotation, both of which are engaged with the rack and respectively connected with the corresponding ratchet driven wheels; The ratchet driven wheel drives single-gear or multi-gear transmission, with the final gear being coaxially connected with a energy storage flywheel; the energy storage flywheel is connected with several doing-work machineries, namely generators.

When the fixed seat in the energy transfer device is fixed at sea bottom, a vertical through hole is set on the center of the floating energy collection device, the energy transfer rod is a swaying pillar with ring tooth set on its surface, the swaying pillar is set in the through hole of the floating energy collection device, the lower end of the swaying pillar is connected with the universal shaft of the fixed seat at sea bottom, several elastic elements are set at the lower part of the swaying pillar where is closed to the fixed seat, one end of each elastic element is immovably connected with the swaying pillar, and another end of each elastic element is immovably connected with the fixed seat; the energy conversion device is a hydraulic cylinder, which is set above the floating energy collection device and is connected to the swaying pillar via gear set.

The gear set includes a driving wheel, a two-way ratchet mechanism and a driven wheel, the driving wheel is engaged with a ring tooth on the surface of the swaying pillar and is connected with the two-way ratchet mechanism and drives the two-way ratchet structure; the two-way ratchet mechanism includes two ratchet wheels with their ratchets swinging in opposite directions; Of said two ratchet wheels, a ratchet wheel is connected with the engaged wheel and drives the engaged wheel; the two-way ratchet mechanism is connected with a hydraulic cylinder in the energy conversion device; a piston, a lead screw piston rod and a lead screw nut are provided in the hydraulic cylinder, the lead screw piston rod is set in the center of the hydraulic cylinder and makes axial movement with the rotation of the lead screw nut at the top of the hydraulic cylinder and thus drives the position to make movement; the lead screw nut is respectively engaged with another ratchet wheel of two ratchet wheels and with the driven wheel.

Bushings are set below the floating energy collection device and in the periphery of the swaying pillar, several rotatable energy collection plates, which are perpendicular to the sea level, are connected around the bushings of swaying pillar in a radiated pattern; the upper end of rotation axis of the energy collection plate is connected with a gear assembly provided in the floating energy collection device; elastic elements are provided between the energy collection plates and the bushings of swaying pillar.

Several funnel-shaped vertical wave energy collection devices with big openings facing downward, which are communicated with seawater, are set at the bottom of the floating energy collection device, the tail of each vertical wave energy collection device is a hydraulic piston cylinder.

Water storage cabinet and weight regulation device are set on the floating energy collection device.

The float limitation device is made up of horizontal chutes, which are set in parallel with two ends in the long axis direction of floating energy collection device and may move up and down along with the rise and fall of sea level, sliding supports or pneumatic piston cylinders or hydraulic piston cylinders which are fixed on two ends along the long axis of the floating energy collection device, as well as elastic elements which are set between the floating energy collection device and shore-side, two ends of the horizontal sliding chute are slidably connected with the pillar fixed at sea bottom via bushings, and the sliding supports or pneumatic piston cylinders or hydraulic piston cylinders are slidably connected with the horizontal sliding chutes.

As compared with the prior art, the technical solution of the present invention can generate the beneficial effects as follows:

The present invention is simple and reliable in structure, low in cost, adaptable to the disordered change in oceanic wave, less in intermediate links of energy conversion, high in energy conversion efficiency, stable and persistent in output, can relatively adequately convert the disordered mechanical energy of oceanic wave in three-dimensional directions (such as up-and-down, front and back, left and right and rotation) to other energy for work and resist risks, and can resist risks.

1—Floating energy collection device, 2—energy transfer device, 3—energy conversion device, 4—energy storage device, 5—doing-work machinery, 101—Collection plate, 102—vertical wave energy collection device, 103—horizontal chute, 104—sliding support, 105 pneumatic piston or hydraulic piston cylinder, 106—energy collection plate, 107—turning wall, 201—Fixed seat, 202—rack push-pull rod, 203—floating push-pull rod, 204—oscillating lever, 205—Bushing of push-pull rod, 206—rack slide opening, 207—rack, 208—ratchet gear 209—ratchet driven wheel, 210—rack slide carriage, 211—rack pull pin, 212—driving wheel, 213—ratchet wheel, 214—Driven wheel, 215—ratchet wheel, 216—swaying pillar, 217—ring tooth, 218—rotation axis, 301—Hydraulic cylinder, 302—piston, 303—lead screw piston rod, 304—lead screw nut 401—Energy Supply pipeline, 402—hydraulic flow regulating valve, 403—inlet-outlet gas valve, 404—hydraulic energy storage device, 405—Energy storage flywheel, 501—Generator.

DETAILED DESCRIPTION OF THE PRESENTLY PREFERRED EMBODIMENTS

The technical proposal of the present invention is further described herein in combination with the attached drawings and embodiments.

Figure 1:
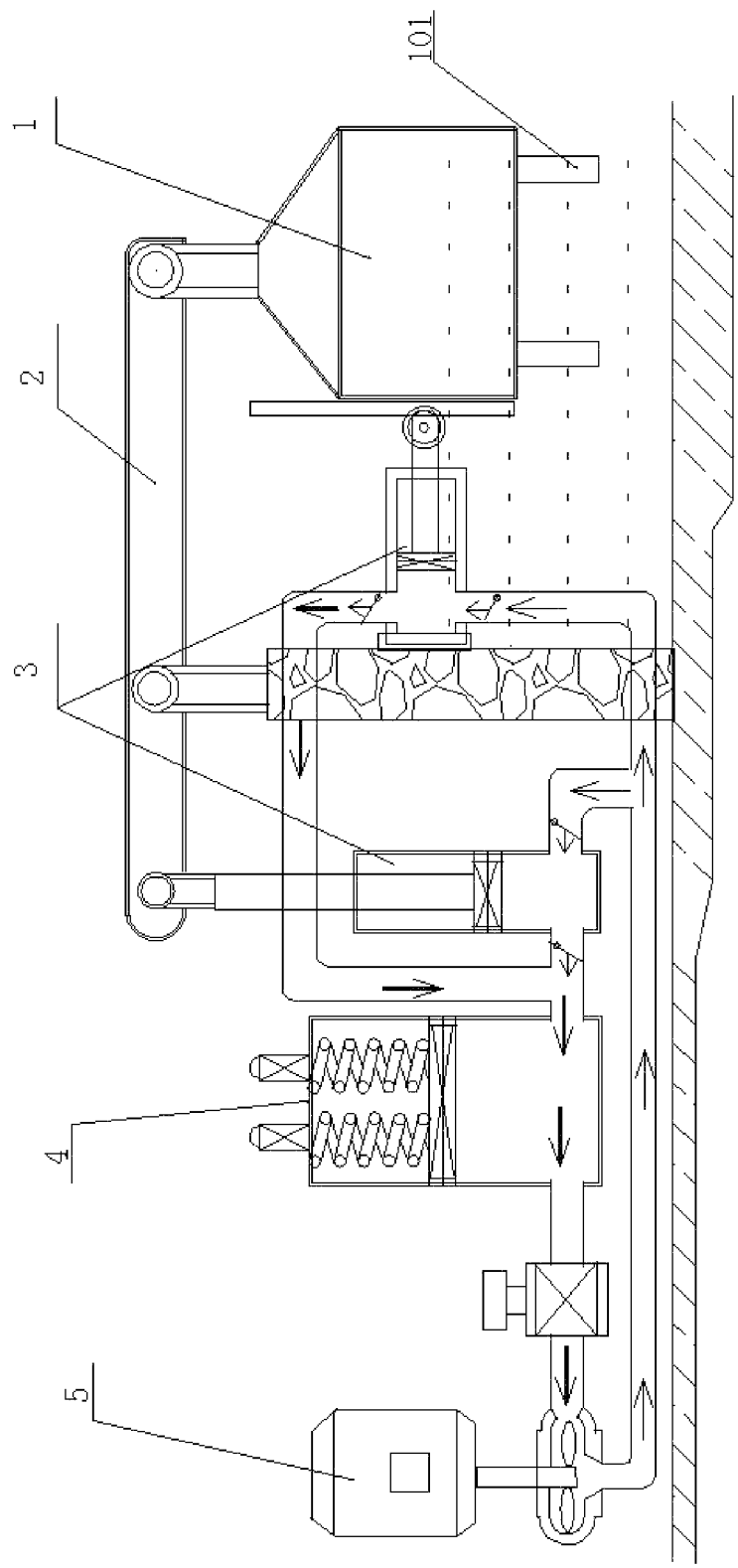
FIG. 1 is the schematic diagram of the overall structure of the present invention.

As shown in FIG. 1, an oceanic wave energy utilization system includes a floating energy collection device 1, an energy transfer device 2, an energy conversion device 3, an energy storage device 4 and a doing-work machinery 5, the floating energy collection device 1 is connected with the energy conversion device 3 via the energy transfer device 2; the floating energy collection device is a hull-shaped float; energy collection plates 101, which are vertical to the sea level, are set at the bottom of the energy collection float; the energy transfer device 2 is movably connected with the floating energy collection device 1 and the energy conversion device 3; one end of the energy storage device 4 is connected with the energy conversion device 3, and another end of the energy storage device 4 is connected with the doing-work machinery 5.

Embodiment 1

Figure 2:
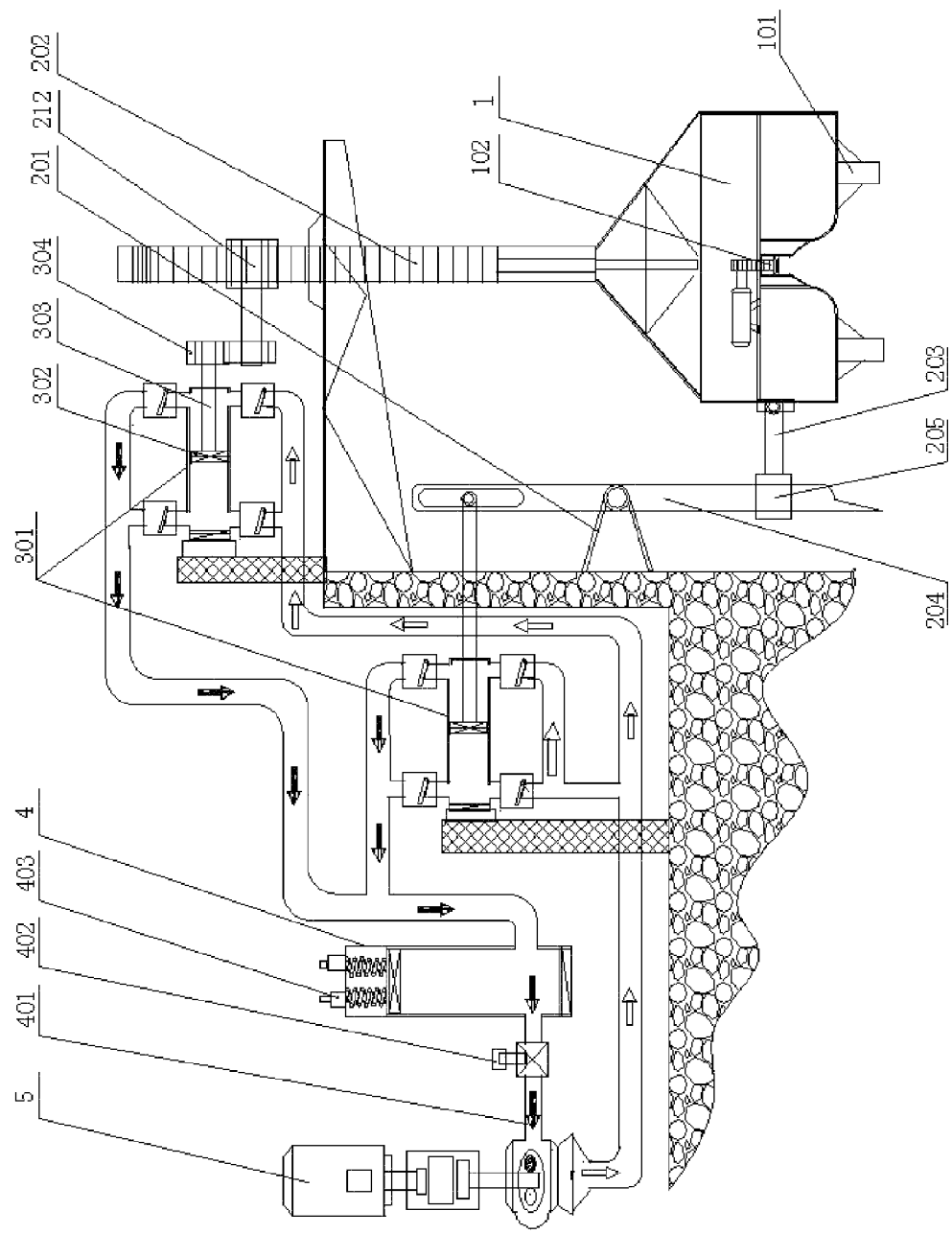
FIG. 2 is the structural diagram of the embodiment 1 of the present invention.

As shown in FIG. 1 and FIG. 2, the floating energy collection device 1 is connected with the energy transfer device 2 which is fixed at shore side; the floating energy collection device 1 is a hull-shaped solid float placed in the sea, its long axis is in parallel with the seashore, its offshore distance exceeds half meter, its water depth is required to exceed 3 meters, its draft is more than 1 meter; energy collection plate 101, which is perpendicular to the sea level and is in parallel with the shore line, is set at the bottom of the floating energy collection device; several funnel-shaped vertical wave energy collection devices with big openings facing downward, which are communicated with seawater, are also set at the bottom of the floating energy collection device, the tail of each vertical wave energy collection device is a hydraulic piston cylinder, which can receive the energy generated from the up and down movement of wave and realize energy conversion. To prevent the damages caused by typhoon and tsunami and to take full advantage of their energy, the material for manufacturing the floating energy collection device shall possess satisfactory corrosion prevention capacity and resistance to shock, and its weight and volume shall be as big as possible, so that housing, swimming pool and other domestic installations and places of entertainment can be built on the floating energy collection device. The energy collection plate 101, which is veridical to the bottom of the floating energy collection device 1, can be designed as dismountable type. In case of small oceanic wave, all plane plates can be pushed on; in case of strong oceanic wave, the plane plates can be partially dismounted; upon arrival of typhoon or tsunami, all plane plates can be dismounted. The generating units shall also have adequate reserves. The building for placement of generating units shall also have the capacity for resisting earthquake, typhoon and tsunami.

The energy transfer device 2 includes rack push-pull rods 202 that are vertically arranged, floating push-pull rods 203 that are horizontally arranged, one end of the floating push-pull rod is movably connected with the floating energy collection device 1, another end of the floating push-pull rod 203 is slidably connected with the lower end of the oscillating lever 204 via a bushing of push-pull rod 205 and can rise or fall with the rise and fall of sea level. The oscillating lever 204 is fixed at shore side via a fixed seat 201, the lower end of the oscillating lever 204 is connected with the floating push-pull rod 203, and the upper end of the oscillating lever 204 is connected with the piston rod of a hydraulic cylinder in the energy conversion device 3.

The oceanic waves generate greater energy when moving onshore and smaller energy when moving off shore. To guarantee the on-shore and off-shore reciprocating motion of floating energy collection device and the stable movement of floating energy collection device, it is advisable to add several spring devices on both sides of the transmission rod and between the floating energy collection device and the vertical shore side.

The energy conversion device 3 includes a gear set and a hydraulic cylinder; the energy storage device 4 is a hydraulic energy storage device, a cylinder with a piston, one side of the space where one end of the piston is located is communicated with a hydraulic cylinder 301 of the energy conversion device, and another side is communicated with the doing-work machinery 5 via an energy supply pipeline 401, and liquid is filled in the place of communication; hydraulic flow regulating valves 402 are set on the energy supply pipeline 401; springs, or elastic materials such as rubber or gasbag, are set in the space where one end of the piston of the hydraulic energy storage device is located, and liquid is filled in the space for the another end; if gas is filled in the space where one end of piston is located, the access or sealing of gas is controlled by an inlet-outlet gas valve 403 located at the end of piston.

The energy obtained by the floating energy collection device 1 is transmitted to the liquid in the hydraulic cylinder 301 via the energy transfer device 2, the liquid in the hydraulic cylinder 301 is communicated with the hydraulic energy storage device, and is also communicated with the energy supply pipeline 401 via the hydraulic flow regulating valve 402. The liquid flow in the energy supply pipeline 401 drives the doing-work machinery 5 to work. According to the quantity of hydraulic cylinders in the energy conversion device, it is feasible to increase the quantity of the hydraulic energy storage devices, so as to accumulate more energy to meet the need of the doing-work machinery.

When the present invention is adopted for power generation, the liquid used in the hydraulic system is in sealed cycle use, and the hydraulic flow regulating valve is a device used to regulate the pressure and flow of liquid. When the hydraulic flow regulating valve is closed, the liquid coming from the hydraulic cylinder enters the energy storage device; the pressure is transmitted to the piston to compress the spring located at another end of this piston. The greater the pressure is, the greater the accumulated energy. When the pressure has reached the required value, the hydraulic flow regulating valve is opened, and the magnitude of flow is determined according to need. Then, the liquid with high-pressure enters the energy supply pipeline to impact the water turbine and drive the generator to generate power.

In order that the generator can generate power with constant frequency and constant voltage, it is required to guarantee stable speed of generator rotor. This objective can be achieve by adopting said energy conversion and energy storage measures to control constant pressure and flow of the liquid flowing into the water turbine. The energy provided by oceanic wave varies with the constant variation in the energy of tidal current. To achieve stable power generation, the energy storage device can be connected with multiple hydraulic flow regulating valves and energy supply pipelines, which are provided for multiple engine units in operation. An engine unit is used to maintain continuous operation. When the pressure in the energy storage device exceeds the required value, the stand-by engine unit is started; when the pressure is less than the required value, the corresponding stand-by unit is closed, and the scale of the generated power depends on the scale of the oceanic wave energy obtained by the floating energy collection device.

Figure 3:
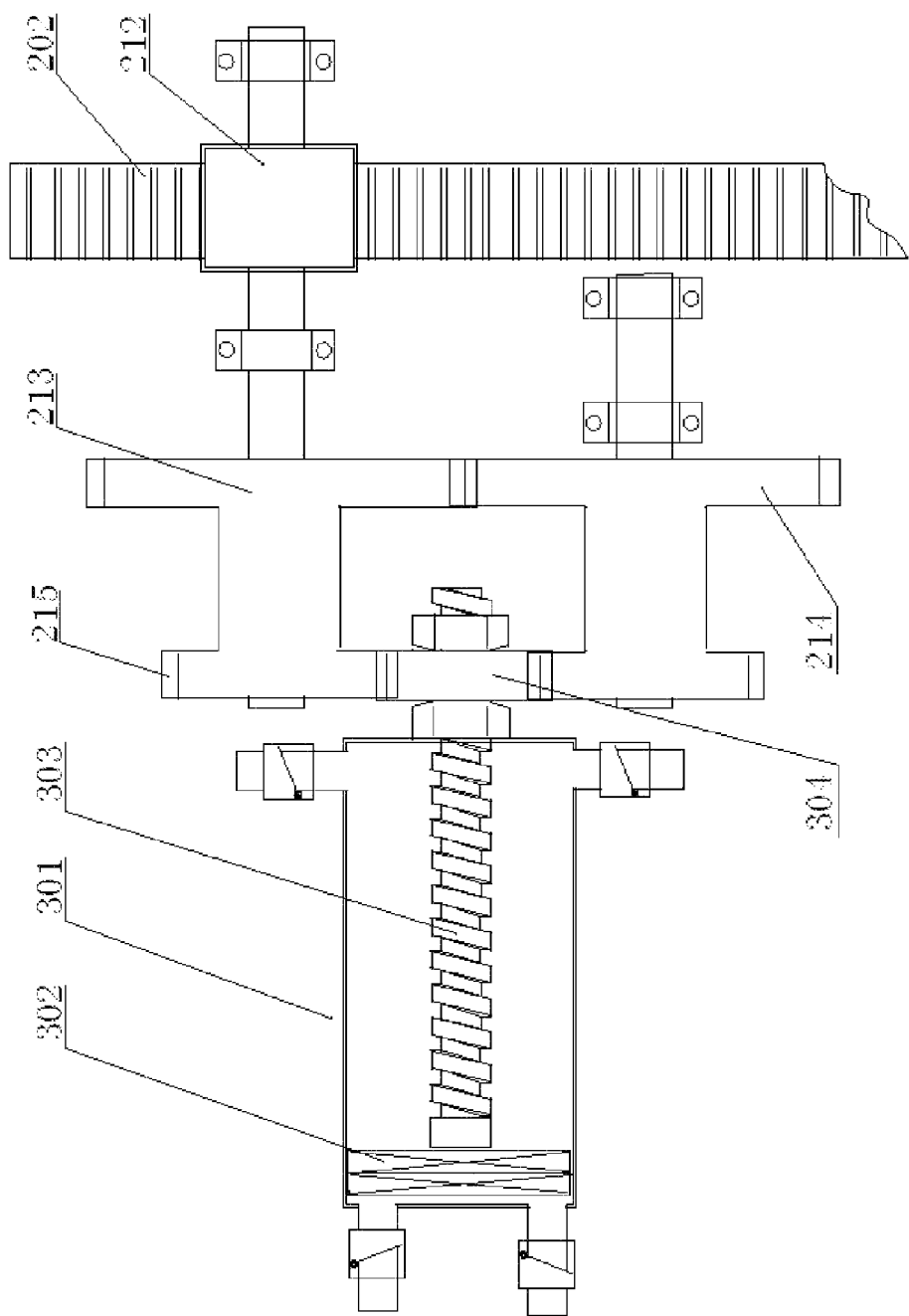
FIG. 3 is the structural diagram of the energy transfer device in the embodiment 1 of the present invention.

As shown in FIG. 3, the lower end of the rack push-pull rod 202 is immovably connected with the top of the floating energy permanent connection ion device 1, and the upper end of the rack push-pull rod is connected with the gear set; the gear set includes a driving wheel 212, a two-way ratchet mechanism and a driven wheel 214; the rack push-pull rod 202 is engaged with the driving wheel 212, the driving wheel 212 is connected with the two-way ratchet mechanism and drives the two-way ratchet mechanism; the two-way ratchet mechanism includes two ratchet wheels with their ratchets swinging in opposite directions; Of said two ratchet wheels, a ratchet wheel 213 nearby the driving wheel is connected with the engaged wheel 214 and drives the engaged wheel 214; the two-way ratchet mechanism is connected with a hydraulic cylinder 301 in the energy conversion device; a piston 302, a lead screw piston rod 303 and a lead screw nut 304 are provided in the hydraulic cylinder 301, the lead screw piston rod 303 is set in the center of the hydraulic cylinder 301 and makes axial movement with the rotation of the lead screw nut 304 at the top of the hydraulic cylinder and thus drives the position 302 to make movement; the lead screw nut 304 is respectively engaged with a ratchet wheel 215 nearby it and the driven wheel 214. With the fluctuation of the sea surface, the floating energy collection device drives the rack push-pull rods to move up and down, the rack push-pull rod 202 is engaged with the driving wheel 212 and drives the ratchet 213 and the ratchet 215 to rotate, the ratchets of the ratchet wheel 213 and the ratchet wheel 215 swing in opposite directions, and the swing directions of ratchets can be changed at the same time when the piston is approaching the cylinder bottom. When the position of the floating energy collection device rises under the action of sea water, the rack push-pull rod at its top moves up, and the driving wheel rotates in the counter-clockwise direction. At this moment, the ratchet swing direction of the ratchet wheel 215 is set as doing work in counter-clockwise direction and sliding in clockwise direction, the ratchet swing direction of the ratchet wheel 213 is set as doing work in clockwise direction and sliding in counter-clockwise direction, so that the driving wheel drives the ratchet wheel 215 to do work in counter-clockwise direction, drives the lead screw nut to make clockwise rotation and drives the piston to move towards the far end; the ratchet wheel 213 does not do work, and its ratchet slides in counter-clockwise direction; When the rack push-pull rod 202 moves downwards, the driving wheel 212 makes clockwise rotation, drives the ratchet wheel 213 to rotate and do work in clockwise direction and drives the driven wheel 214 to rotate in counter-clockwise direction, the driven wheel 214 drives the lead screw nut to make clockwise rotation and thus drives the piston to move towards the far end, and the ratchet wheel 215 slides in clockwise direction without doing work. In this manner, the rack push-pull rod 202 reciprocates up-and-down and thus drives the piston to move towards the far end. When it moves and approaches the cylinder bottom, the swing directions of the ratchet wheel 215 and the ratchet wheel 213 are changed by means of the travel switch mechanism, so that the piston 302 moves toward the near end and does work due to the up-and-down movement of the rack push-pull rod 202. When the piston 302 approaches the cylinder bottom at near end, the swing directions of the ratchet wheel 215 and the ratchet wheel 213 are again changed by means of the travel switch mechanism, so that the piston 302 moves towards the opposite direction again. In this manner, the transmission and conversion of interrupted and reciprocating energy are realized, and energy is persistently and stably released to do work by means of the energy storage device and the hydraulic flow regulating valve.

It is feasible to set up several gear sets and the corresponding hydraulic cylinders on the rack push-pull rod 202, so as to meet the requirement for energy conversion.

Such kind of mechanism is also applicable to horizontal energy transfer device. This application can be achieved by replacing the piston rod connected to the upper end of the oscillating lever (shown in FIG. 2) with the rack push-pull rod and said device.

Figure 4:
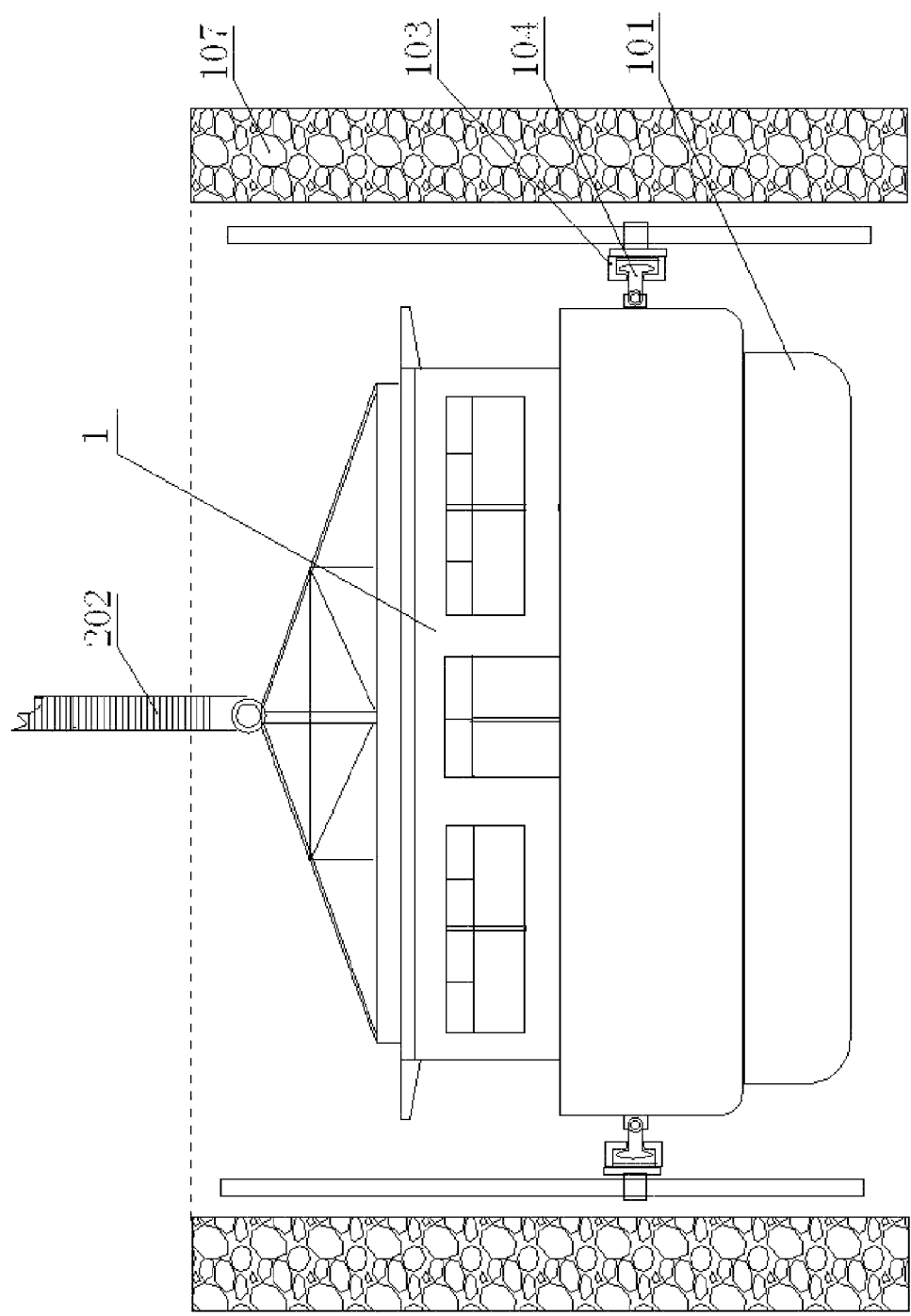
FIG. 4 is the structural diagram illustrating the connection mode between the floating energy collection device and the turning wall in the embodiment 1 of the present invention.
Figure 7:
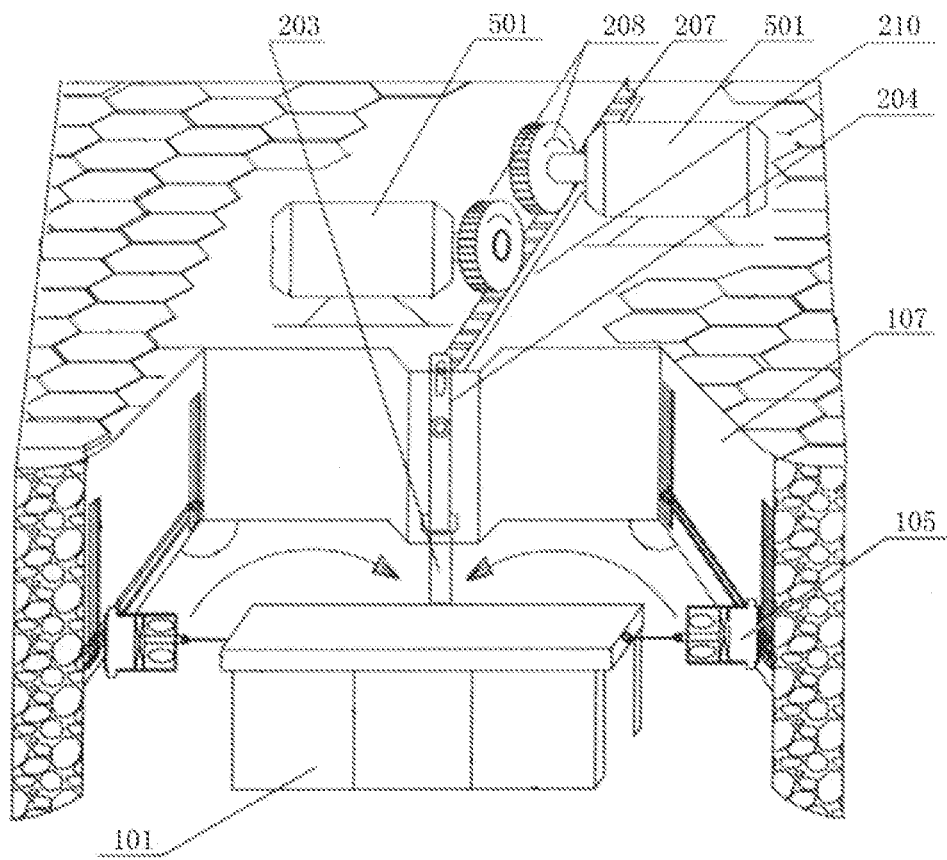
FIG. 7 is the structural diagram illustrating the connection mode between the floating energy collection device and the turning wall in the embodiment 2 of the present invention.
Figure 8:
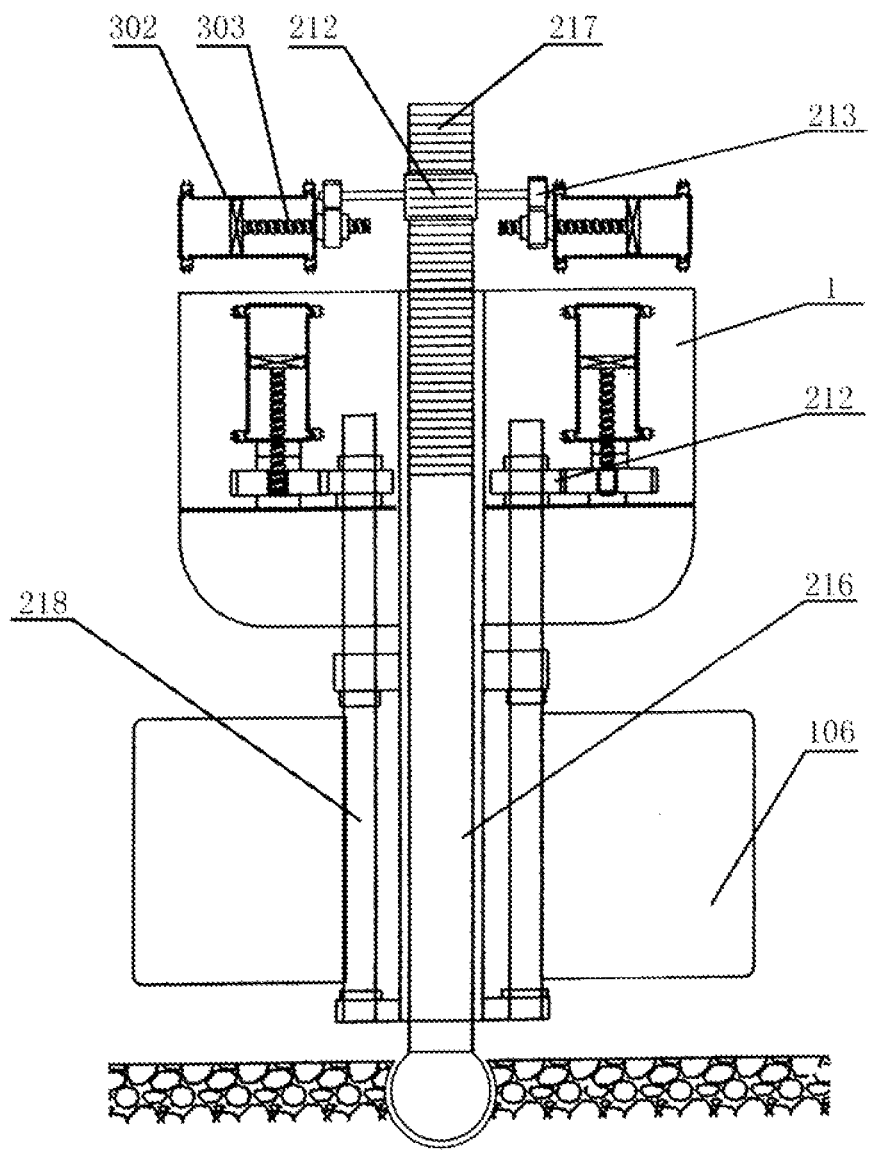
FIG. 8 is the structural diagram of the embodiment 3 of the present invention.

As shown in FIG. 4 and FIG. 7, a reverse flow device is set nearby the floating energy collection device 1, the reverse flow device includes a vertical wall at shore side as well as turning walls 107 which are vertically arranged on two sides of the vertical wall at shore side, the vertical wall at shore side and the turning walls 107 on its two sides make up a trapezoid. The float limitation device in the floating energy collection device 1 is made up of horizontal chutes 103, which are set in parallel with two ends in the long axis direction of floating energy collection device and may move up and down along with the rise and fall of sea level, sliding supports 104 or pneumatic piston cylinders or hydraulic piston cylinders 105 which are fixed on two ends along the long axis of the floating energy collection device 1, as well as elastic elements which are set between the floating energy collection device and shore-side, two ends of each horizontal sliding chute 103 are slidably connected with the pillar fixed at sea bottom via bushings, and the sliding supports 104 or pneumatic piston cylinders or hydraulic piston cylinders 105 are slidably connected with the horizontal sliding chutes 103. This float limitation device is adapted to the changes in the oceanic wave and tidal current, resist typhoon and tsunami, confine the range of movement of the floating energy collection device and obtain the corresponding energy.

Embodiment 2

Figure 5:
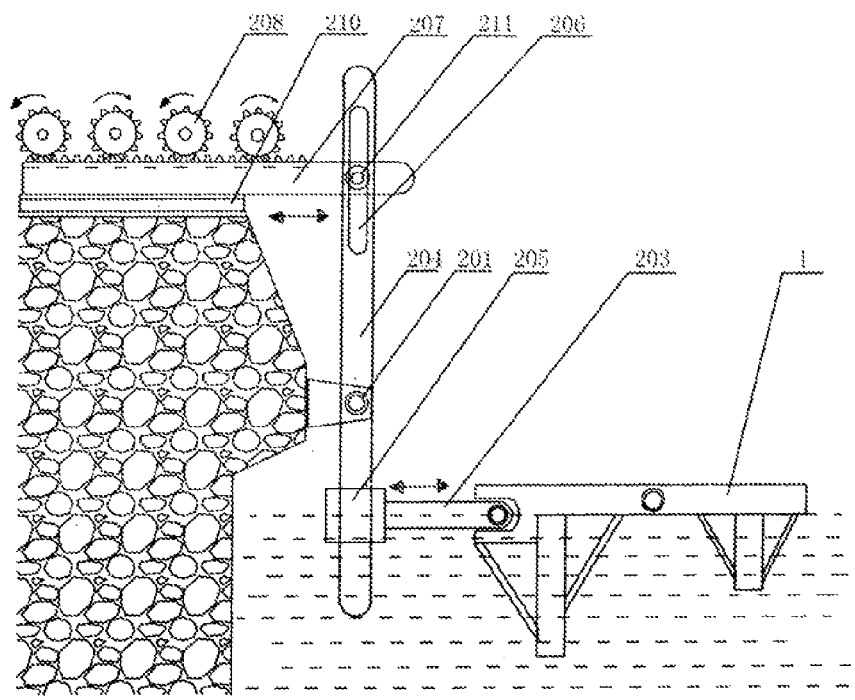
FIG. 5 is the structural diagram of the embodiment 2 of the present invention.

As shown in FIG. 1 and FIG. 5, when the floating energy collection device 1 is connected to the energy transfer device 2 fixed at shore side, the floating energy collection device 1 is a solid float with specific weight less than sea water, it is preferred that the floating energy collection device 1 is designed as elongated floater with "n" or "T" shaped-section, so that it is floated on water surface, with a small fraction emerging from water. The material for manufacturing the horizontal floating surface of the solid floater can be made up of several used motor tyres, which are connected together. The seawater pushing stress surface(s) of the solid floater may be a surface or two parallel surfaces, which are vertically arranged along the elongated long axis and composed of sea-water corrosion resisting materials, such as ceramic, tempered glass, fiber glass, plastic, non-corrosive metal and treated timber. The floating energy collection device is so designed to adapt to the fluctuations of sea water on the one hand and to acquire energy to the greatest extent on the other end. Considering that the oceanic wave is inclined to move onshore, the elongated floating energy collection device is arranged along the direction in parallel with seashore, so that the energy of wave vertically acts on the vertical stress surface, with its offshore distance being determined according to wave period and wave velocity. In case of smaller oceanic wave, the vertical stress surface of the floating energy collection device should be designed as big as possible, so as to obtain acquire energy as much as possible; in case of excessive oceanic wave, it is advisable to change partial vertical plates into horizontal plates, so as to avoid the facilities from being damaged but acquire adequate energy; when typhoon or tsunami arrives, it is advisable to immerse the floating energy collection device into sea bottom or move it onshore after dismantlement, and to continue its normal working after the extreme weather.

The energy transfer device 2 includes a horizontally arranged floating push-pull rod and a vertically arranged oscillating lever 204, the floating push-pull rod 203 is an energy transmission rod with specific weight being less than sea water, one end of the floating push-pull rod 203 is movably connected with the floating energy collection device 1, and another end of the floating push-pull rod is slidably connected with the lower end of the oscillating lever 204 via the bushing of push-pull rod 205; the oscillating lever 204 is fixed on the vertical wall at shore side via the fixed seat 201, and rack slide openings 206 are arranged on its upper end.

Figure 6:
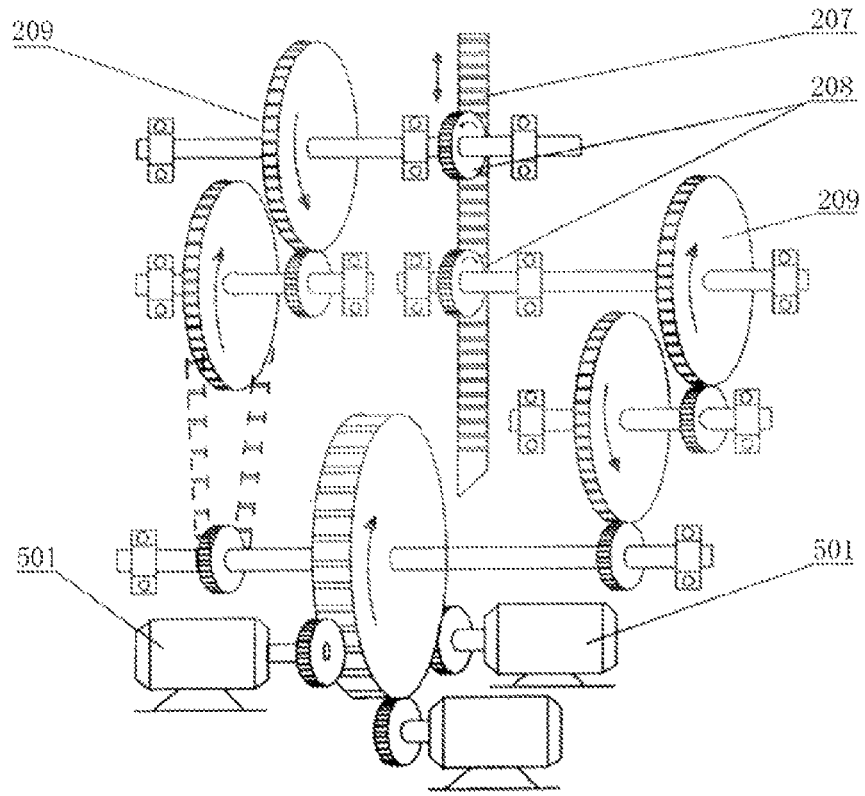
FIG. 6 is the structural diagram illustrating the connections among the energy conversion device, the energy storage device and the doing-work machinery in the embodiment 2 of the present invention.

As shown in FIG. 5 and FIG. 6, the energy conversion device 3 is a gear assembly, the energy storage device 4 is an energy storage flywheel; the doing-work machinery 5 is a generator 501; the gear assembly includes a rack 207, a ratchet gear 208 and a ratchet wheel driven wheel 209, the rack 207 is slidably arranged in a rack slide carriage 210, which is horizontally arranged at shore side. One end of the rack 207 is connected with a rack slide opening 206 on the oscillating lever 204 through a rack pull pin 38; the ratchet gear 208 includes a clockwise rotation ratchet wheel and a counter-clockwise rotation ratchet wheel, both of which are engaged with the rack and respectively connected with the corresponding ratchet driven wheels 209; The ratchet driven wheel 209 drives single-gear or multi-gear transmission, with the final gear being coaxially connected with a energy storage flywheel; the energy storage flywheel is connected with several doing-work machineries, namely generators 501.

When the floating energy collection device makes reciprocating motion along with the of oceanic wave, the sliding rack will also make reciprocating motion via the oscillating lever; Driven by the rack, the ratchet gears will, according to the requirements for the rotation of ratchet wheel, respectively make clockwise rotation and reverse rotation and simultaneously drive the ratchet driven wheel to rotate. The whole gear assembly is a group of variable speed energy storage devices designed to convert low speed energy to high speed energy. The function of the variable speed energy storage device can also be realized by transmission gear box, but it is advisable that the energy storage flywheel makes the final output.

The generators 501 are composed of several generator sets, all of which are driven by the energy Storage flywheel. Of several generators, one generator is a tachometer generator.

The energy storage flywheel is connected with the tachometer generator, and the tachometer generator is connected with the start control system of the generator set. In order that the generator can generate power with constant frequency and constant voltage, it is required to guarantee stable speed of generator rotor. After said energy conversion device and variable speed energy storage device are adopted in particular after the inertia flywheel is adopted for operating, it is feasible to convert the disordered mechanical energy of oceanic wave to ordered high-speed available energy. Prior to the start of generators, the floating energy collection device is firstly started, the floating push-pull rod drives the rack to make reciprocating motion, drives the ratchet gear to rotate and then drives the variable speed energy storage device and the energy storage flywheel to rotate. When the rotation speed of energy storage flywheel has reached the requirement for power generation, the tachometer generator can start partial generators via the corresponding control mechanisms. The rotation speed of generators is set within certain range; when the rotation speed of generator reaches the upper limit, the tachometer generator can also start the standby generator to work and increase duty via the corresponding control mechanism; When the speed of generator drops to the lower limit, the tachometer generator closes the corresponding generators to reduce load via the corresponding control mechanism. In a word, so long as the rotation speed of the energy storage flywheel (namely, the rotation speed of generator) always keeps constant, it is feasible to generate power with constant frequency and constant voltage. When the rotation speed of reaches the speed required for power generation, all the energy provided by the oceanic wave can be used in power generation except for partial energy consumed in overcoming friction. Since the energy of oceanic wave and tidal current changes sometimes, the generated electric quantity also varies accordingly, depending on the magnitude of oceanic wave energy acquired by the floating energy collection device. So long as the floating energy collection device can obtain adequate energy, sufficient electric quantity can be produced.

As shown in FIG. 7, a reverse flow device is set nearby the floating energy collection device 1, the reverse flow device includes a vertical wall at shore side as well as turning walls 107 which are vertically arranged on two sides of the vertical wall at shore side, the vertical wall at shore side and the turning walls 107 on its two sides make up a trapezoid. When the oceanic waves move shoreward, the frontal waves push the floating energy collection device 1 to move in onshore direction; when the speed of oceanic waves becomes lower, they push the floating push-pull rod to do work; the lateral oceanic waves do not reduce speed and rush at the turning walls 107, turn to the vertical walls at shore side. The turning oceanic waves on both sides concentrate; Under the blocking action of vertical walls at shore side, the oceanic waves reflux and rush at the floating energy collection device, so that it moves towards the offshore direction. In each wave period, the floating energy collection device can make reciprocating motion once under the pushing action of oceanic wave. In this manner, when the floating energy collection device makes reciprocating motion incessantly, it can generate power without interruption.

The float limitation device in the floating energy collection device 1 is made up of horizontal chutes, which are set on the turning walls 107 and make up-and-down movement along with the fluctuation of sea level, pneumatic or hydraulic piston cylinders 105, which are set nearby two ends of the turning walls 107 on the floating energy collection device, the pneumatic or hydraulic piston cylinder 105 is slidably connected with the horizontal chute 103, and other elastic transduction device or energy storage device can also be used to replace the pneumatic or hydraulic piston cylinder 105. This device can enable the floating energy collection device to sufficiently utilize the energy of oceanic wave movement, and can confine the floating energy collection device from leaving its operating position and buffer the energy peak.

The energy conversion mode is also applicable to wind power generation or power generation with other low-speed and disordered energy.

Adaptive modification can be made to floating energy collection device, the energy transfer device, the energy conversion device, the energy storage device and the doing-work machinery in this embodiment as well as various component parts in the embodiment 1, so that they can be combined into an oceanic wave energy conversion system.

Embodiment 3

As shown in FIG. 2, FIG. 3, FIG. 5 and FIG. 8, when the fixed seat 1 in the energy transfer device 2 is fixed at sea bottom, a vertical through hole is set on the center of the floating energy collection device 1, the energy transfer rod is a swaying pillar 216, with ring tooth 217 being set on its surface, the swaying pillar 216 is set in the through hole of the floating energy collection device 1, the lower end of the swaying pillar is connected with the universal shaft of the fixed seat 201 at sea bottom, so that the swaying pillar sways with the swaying of the floater to prevent the pillar from fracture; several elastic elements are set at the lower part of the swaying pillar where is closed to the fixed seat 201, one end of each elastic element is immovably connected with the swaying pillar, and another end of each elastic element is immovably connected with the fixed seat; the elastic elements have holding action for the swaying pillar, so that the swaying pillar can only sway within certain range; The energy conversion device is a hydraulic cylinder 301, which is set on the floating energy collection device and is connected with the swaying pillar 216 through a gear set; the gear set includes a driving wheel 212, a two-way ratchet mechanism and a 214; the driving wheel 212 is engaged with the ring tooth 217 on the surface of the swaying pillar 216, and is connected with the two-way ratchet mechanism to drive the two-way ratchet structure; the two-way ratchet mechanism includes two ratchet wheels with their ratchets swinging in opposite directions; Of two ratchet wheels, the ratchet wheel 213 set nearby the driving wheel is connected with the driven wheel 214 and drives the driven wheel 214; A piston 302, a lead screw piston rod 303 and a lead screw nut 304 are set on the hydraulic cylinder 301; the lead screw piston rod 303 is set on the center of the hydraulic cylinder, makes axial movement with the rotation of the lead screw nut 304 at the top of hydraulic cylinder and drives the piston 302 to make movement; The lead screw nut 304 is respectively engaged with the ratchet wheel 215 nearby it and the driven wheel 214. When the swaying pillar is swaying, the energy generated by swaying displacement is transmitted to the hydraulic cylinder.

Bushings are set below the floating energy collection device 1 and in the periphery of the swaying pillar 216, several rotatable energy collection plates 106, which are perpendicular to the sea level, are connected around the bushings of swaying pillar in a radiated pattern; the upper end of rotation axis 218 of the energy collection plate 106 is connected with a gear set provided in the floating energy collection device 1; elastic elements are provided between the energy collection plates 106 and the bushings of swaying pillar 216. After the energy collection plates 106 have received the impact from oceanic waves, these elastic elements have holding action for the energy collection plates 106.

A water storage cabinet and a weight regulation device are set on the floating energy collection device. The weight regulation device can regulate the gross weight of the floating energy collection device according to the magnitude of oceanic waves as well as the weight of the floating energy collection device and its accessories, so as to regulate the relative displacement travel between the floating energy collection device and the swaying pillar and thus utilize the energy of oceanic waves to the greatest extent. Upon arrival of disastrous weather such as typhoon or tsunami, the water storage cabinet of floating energy collection device is filled with adequate water, so that the floating energy collection device drops to the sea bottom and is prevented from damage of surge. After disappearance of destructive surge, the floating energy collection device can rise from sea bottom and continue the work of oceanic wave energy conversion.

In the past, it is believed that only waves with height exceeding 1.3 meters can be useful for power generation. According to the technical solution in this embodiment, waves with height of 0.5 meter can also be used for power generation.

This embodiment can be applied in combination with the hydraulic energy storage device and doing-work machinery in the embodiment 1 to achieve the objective of oceanic wave energy collection and conversion.

The ocean wave energy generating equipment of the present invention is simple and reliable in structure, low in cost, adaptable to the disordered change in oceanic wave, less in intermediate links of energy conversion, high in energy conversion efficiency, big in output power, stable and persistent in voltage output, and can relatively adequately convert the disordered mechanical energy of oceanic wave in three-dimensional directions (such as up-and-down, front and back, left and right and rotation) to other energy for work and resist extreme weather.

The power source adopted by the present invention is pollution-free energy, which can also be used for hydrogen production, desalination of sea water and processing of foodstuff as well as various industrial/agriculture products in addition to power generation.

Finally it must be mentioned as follows: said embodiments are merely used to describe rather than limit the present invention; Although the detailed description of the present invention is provided with reference to preferred embodiments, those skilled in the art should understand that all the modifications or equitable substitutions to the present invention without deviation from the spirit and range of present invention shall be covered by the claims of present invention.

What is claimed is:

1. An oceanic wave energy utilization system including a floating energy collection device, an energy transfer device and an energy conversion device, the floating energy collection device being connected to the energy conversion device via the energy transfer device, wherein the floating energy collection device is made up of a hull-shaped float and a float limitation device, vertical energy collection plates are arranged at the underside of the float, while the energy transfer device is made up of a fixed seat and an energy transfer rod, with said fixed seat being fixed at shore-side or at the seabed and movably connected to the energy transfer rod, the energy transfer rod is movably connected to the floating energy collection device and to the energy conversion device, wherein the oceanic wave energy utilization system also includes an energy storage device and doing-work machinery, one end of the energy storage device is connected with the energy conversion device, and another end of the energy storage device is connected with the doing-work machinery, when the fixed seat in the energy transfer device is set at shore-side, the energy transfer device includes rack push-pull rods that are vertically arranged, floating push-pull rods that are horizontally arranged as well as a lever that is movably connected to the fixed seat, which are respectively movably connected with the floating energy collection device and the energy conversion device; the energy conversion device includes a gear set and a hydraulic cylinder; the energy storage device is a hydraulic energy storage device, a cylinder with a piston, with spring or gasbag being set in the space where one end of the piston is located, and liquid being set in another end of the piston; the energy storage device is communicated with a hydraulic cylinder of the energy conversion device and a energy supply pipeline; the energy supply pipeline is communicated with the doing-work machinery, and hydraulic flow regulating valves are set on the energy supply pipeline.

2. The oceanic wave energy utilization system of claim 1, wherein the lower end of the rack push-pull rod is connected with the top of the floating energy collection device, and the upper end of the rack push-pull rod is connected with the gear set; the gear set includes a driving wheel, a two-way ratchet mechanism and a driven wheel; the rack push-pull rod is engaged with the driving wheel, the driving wheel is connected with the two-way ratchet mechanism and drives the two-way ratchet structure; the two-way ratchet mechanism includes two ratchet wheels with their ratchets swinging in opposite directions; of said two ratchet wheels, a ratchet wheel is connected with the engaged wheel and drives the engaged wheel; the two-way ratchet mechanism is connected with a hydraulic cylinder in the energy conversion device; a piston, a lead screw piston rod and a lead screw nut are provided in the hydraulic cylinder, the lead screw piston rod is set in the center of the hydraulic cylinder and makes axial movement with the rotation of the lead screw nut at the top of the hydraulic cylinder and thus drives the position to make movement; the lead screw nut is respectively engaged with another ratchet wheel of two ratchet wheels and the driven wheel.

3. The oceanic wave energy utilization system of claim 2, wherein the floating push rod is an energy transfer rod with specific weight being smaller than seawater, one end of the energy transfer rod is movably connected with the water level part of the floating energy collection device, and another end of the energy transfer rod is in slidably connected with the lower end of a oscillating lever via the bushing of push-pull rod; the oscillating lever is vertically fixed at shore-side via the fixed seat, the lower end of the oscillating lever is connected with the floating push-pull rod, and the upper end of the oscillating lever is connected with the piston rod of a hydraulic cylinder in the energy conversion device.

4. The oceanic wave energy utilization system of claim 1, wherein several funnel-shaped vertical wave energy collection devices with big openings facing downward, which are communicated with seawater, are set at the bottom of the floating energy collection device, the tail of each vertical wave energy collection device is a hydraulic piston cylinder.

5. The oceanic wave energy utilization system of claim 1, wherein a water storage cabinet and a weight regulation device are set on the floating energy collection device.

6. The oceanic wave energy utilization system of claim 1, wherein the float limitation device is made up of horizontal chutes, which are set in parallel with two ends in the long axis direction of floating energy collection device and may move up and down along with the rise and fall of sea level, sliding supports or pneumatic piston cylinders or hydraulic piston cylinders which are fixed on two ends along the long axis of the floating energy collection device, as well as elastic elements which are set between the floating energy collection device and shore-side, two ends of the horizontal sliding chute are slidably connected with the pillar fixed at sea bottom via bushings, and the sliding supports or pneumatic piston cylinders or hydraulic piston cylinders are slidably connected with the horizontal sliding chutes.

7. An oceanic wave energy utilization system including a floating energy collection device, an energy transfer device and an energy conversion device, the floating energy collection device being connected to the energy conversion device via the energy transfer device, wherein the floating energy collection device is made up of a hull-shaped float and a float limitation device, vertical energy collection plates are arranged at the underside of the float, while the energy transfer device is made up of a fixed seat and an energy transfer rod, with said fixed seat being fixed at shore-side or at the seabed and movably connected to the energy transfer rod, the energy transfer rod is movably connected to the floating energy collection device and to the energy conversion device, wherein the oceanic wave energy utilization system also includes an energy storage device and doing-work machinery, one end of the energy storage device is connected with the energy conversion device, and another end of the energy storage device is connected with the doing-work machinery, when the fixed seat of the energy transfer device is set at shore-side, the energy transfer device includes a horizontally arranged floating push-pull rod and a vertically arranged oscillating lever, the energy conversion device is a gear assembly; the energy storage device is an energy storage flywheel; and the doing-work machinery is a generator.

8. The oceanic wave energy utilization system of claim 7, wherein the floating push rod is an energy transmission rod with specific weight being smaller than seawater, one end of the energy transmission rod is movably connected with the floating energy collection device, another end of the energy transmission rod is connected with the lower end of a oscillating lever via the bushing of push-pull rod; the oscillating lever is vertically fixed on the seat at shore-side via the fixed seat, rack slide opening is set on the upper end of the oscillating lever and is movably connected with the sliding rack in the rack slide carriage; the sliding rack drives the gear assembly to work.

9. The oceanic wave energy utilization system of claim 8, wherein the gear assembly includes a rack, a ratchet gear and a ratchet driven wheel, the rack is slidably provided in the rack slide carriage which is horizontally set at shore-side, one end of the rack is connected with the rack slide opening on the oscillating lever via rack pull pin; the ratchet gear includes a clockwise rotation ratchet wheel and a counter-clockwise rotation ratchet wheel, both of which are engaged with the rack and respectively connected with the corresponding ratchet driven wheels; the ratchet driven wheel drives single-gear or multi-gear transmission, with the final gear being coaxially connected with a energy storage flywheel; the energy storage flywheel is connected with several doing-work machineries, namely generators.

10. An oceanic wave energy utilization system including a floating energy collection device, an energy transfer device and an energy conversion device, the floating energy collection device being connected to the energy conversion device via the energy transfer device, wherein the floating energy collection device is made up of a hull-shaped float and a float limitation device, vertical energy collection plates are arranged at the underside of the float, while the energy transfer device is made up of a fixed seat and an energy transfer rod, with said fixed seat being fixed at shore-side or at the seabed and movably connected to the energy transfer rod, the energy transfer rod is movably connected to the floating energy collection device and to the energy conversion device wherein the oceanic wave energy utilization system also includes an energy storage device and doing-work machinery, one end of the energy storage device is connected with the energy conversion device, and another end of the energy storage device is connected with the doing-work machinery, when the fixed seat in the energy transfer device is fixed at sea bottom, a vertical through hole is set on the center of the floating energy collection device, the energy transfer rod is a swaying pillar with ring tooth set on its surface, the swaying pillar is set in the through hole of the floating energy collection device, the lower end of the swaying pillar is connected with the universal shaft of the fixed seat at sea bottom, several elastic elements are set at the lower part of the swaying pillar where is closed to the fixed seat, one end of each elastic element is immovably connected with the swaying pillar, and another end of each elastic element is immovably connected with the fixed seat; the energy conversion device is a hydraulic cylinder, which is set above the floating energy collection device and is connected to the swaying pillar via gear set.

11. The oceanic wave energy utilization system of claim 10, wherein the gear set includes a driving wheel, a two-way ratchet mechanism and a driven wheel, the driving wheel is engaged with a ring tooth on the surface of the swaying pillar and is connected with the two-way ratchet mechanism and drives the two-way ratchet structure; the two-way ratchet mechanism includes two ratchet wheels with their ratchets swinging in opposite directions; of said two ratchet wheels, a ratchet wheel is connected with the engaged wheel and drives the engaged wheel; the two-way ratchet mechanism is connected with a hydraulic cylinder in the energy conversion device; a piston, a lead screw piston rod and a lead screw nut are provided in the hydraulic cylinder, the lead screw piston rod is set in the center of the hydraulic cylinder and makes axial movement with the rotation of the lead screw nut at the top of the hydraulic cylinder and thus drives the position to make movement; the lead screw nut is respectively engaged with another ratchet wheel of two ratchet wheels and with the driven wheel.

12. The oceanic wave energy utilization system of claim 11, wherein bushings are set below the floating energy collection device and in the periphery of the swaying pillar, several rotatable energy collection plates, which are perpendicular to the sea level, are connected around the bushings of swaying pillar in a radiated pattern; the upper end of rotation axis of the energy collection plate is connected with a gear assembly provided in the floating energy collection device; elastic elements are provided between the energy collection plates and the bushings of swaying pillar.

* * * * *